(12) United States Patent
Sharp

(10) Patent No.: US 7,692,746 B2
(45) Date of Patent: Apr. 6, 2010

(54) DIGITALLY-SWITCHABLE BANDPASS FILTER

(75) Inventor: Gary D. Sharp, Boulder, CO (US)

(73) Assignee: Real D, Beverly Hills, CA (US)

( * ) Notice: Subject to any disclaimer, the term of this patent is extended or adjusted under 35 U.S.C. 154(b) by 251 days.

(21) Appl. No.: 11/161,376

(22) Filed: Aug. 1, 2005

(65) Prior Publication Data

US 2007/0024779 A1 Feb. 1, 2007

(51) Int. Cl.
*G02F 1/1335* (2006.01)

(52) U.S. Cl. .................. 349/117; 349/118; 349/119; 349/18

(58) Field of Classification Search .......... 349/117–119
See application file for complete search history.

(56) References Cited

U.S. PATENT DOCUMENTS

| | | | |
|---|---|---|---|
| 5,365,535 A | | 11/1994 | Kaisha |
| 5,658,490 A | * | 8/1997 | Sharp et al. ............ 252/299.01 |
| 5,680,386 A | | 10/1997 | Le Carvennec et al. |
| 5,751,384 A | * | 5/1998 | Sharp .......................... 349/18 |
| 5,764,365 A | | 6/1998 | Finarov |
| 5,974,020 A | | 10/1999 | Ju et al. |
| 6,100,944 A | * | 8/2000 | Sharp et al. .................... 349/19 |
| 6,141,071 A | * | 10/2000 | Sharp ......................... 349/121 |
| 6,172,722 B1 | * | 1/2001 | Sharp .......................... 349/80 |
| 6,204,904 B1 | * | 3/2001 | Tillin et al. ................. 349/119 |
| 6,222,812 B1 | | 4/2001 | Yoo et al. |
| 6,307,627 B1 | | 10/2001 | Vurens |
| 6,377,520 B2 | | 4/2002 | Freeman et al. |
| 6,417,892 B1 | * | 7/2002 | Sharp et al. .................. 348/742 |
| 6,452,646 B1 | * | 9/2002 | Sharp et al. ................... 349/18 |
| 6,565,974 B1 | | 5/2003 | Uchiyama |
| 6,593,985 B1 | * | 7/2003 | Taira et al. .................. 349/119 |
| 6,816,449 B2 | | 11/2004 | Yoo et al. |
| 6,900,865 B2 | | 5/2005 | Tillin |
| 7,511,787 B2 | * | 3/2009 | Sharp ......................... 349/119 |
| 2004/0136309 A1 | | 7/2004 | Arai et al. |

FOREIGN PATENT DOCUMENTS

| | | | |
|---|---|---|---|
| JP | 04116603 A2 | 4/1992 | |
| JP | 10068816 A2 | 3/1998 | |

OTHER PUBLICATIONS

International Search report and written opinion in corresponding PCT application No. PCT/US06/25487 mailed May 15, 2008.
International Preliminary Report on Patentability for PCT/US2006/025487 mailed Dec. 11, 2008.

\* cited by examiner

*Primary Examiner*—David Nelms
*Assistant Examiner*—Thanh-Nhan P Nguyen
(74) *Attorney, Agent, or Firm*—Baker & McKenzie LLP

(57) ABSTRACT

Disclosed are digitally-switchable bandpass filters combining non-tunable retarder stacks with switchable liquid crystal cells. The disclosed filter embodiments function like a filter wheel with no moving parts that may provide faster switching, better image registration, compact size, and lower electrical power consumption. These benefits are attractive in portable handheld devices, such as bio-hazard sensors or glucose monitors.

35 Claims, 4 Drawing Sheets

DIGITALLY-SWITCHABLE BANDPASS FILTER

TECHNICAL FIELD

Disclosed embodiments relate to bandpass filters for optical systems, and more particularly to digitally-switchable liquid crystal bandpass filters.

BACKGROUND

A tunable filter uses electrically controlled liquid crystal (LC) elements to transmit specific wavelengths of light through the filter by exploiting the variable retardation associated with certain LC modes as a means of shifting a spectral feature. One type of LC tunable filter is a Lyot (or Lyot-hybrid) polarization interference filter. With a Lyot filter, a bandpass profile is synthesized through multistage filtering using geometric relationships between retarder stack films. The polarization analyzer of one stage forms the input polarization for a subsequent stage, such that (N+1) polarizing films are used for an N-stage filter. In other word, 2 polarizing films are used for 1 filter stage, 3 polarizing films for 2 filter stages, and so forth. The overhead associated with calibrating a fully tunable Lyot bandpass filter to provide acceptable spectral characteristics can be significant. Additionally, each polarizing film has approximately a 10% transmission loss. Consequently, tunable Lyot filters with high finesse and acceptable dynamic ranges are not only bulky and expensive, but also have poor peak transmission.

A Solc or Solc-like filter, on the other hand, can be synthesized using only two polarizers bonded to a single retarder stack. Also, the Solc filter can, in principle, be customized to reduce side-lobe levels. Presently known bandpass-tuning Solc filter approaches, however, require that each multi-order retarder stack be fully tunable. In practice, there is no significant improvement in throughput because the insertion loss of a polarizer is traded for the additional LC cell loss. Furthermore, the construction of a Solc filter is more challenging than that of a Lyot filter, in that precise alignment of many interleaved active and passive elements must be done before system calibration can commence. Consequently, if at any point an error is made in building such an assembly, a large amount of high value material may have to be scrapped.

SUMMARY

Described are digitally-switchable bandpass filters with multiple polarizers and enhanced functionality within each stage of the filter. The switchable filters contain fixed elements, such as retarder stacks having pre-determined sets of available spectral profiles, and digital quasi-achromatic polarization switches, such as liquid crystal (LC) cells for selecting the particular spectral output profiles from the retarder stacks.

The presently disclosed filter embodiments function like a filter wheel with no moving parts. The bandpass filter structure permits selection among predefined sets of spectral profiles. Additionally, there are several unique advantages of the presently disclosed digitally-switchable bandpass filter relative to an electro-mechanical device. The lack of moving parts translates into: (a) potential for faster switching, (b) potential for better image registration, (c) compact size, and (d) lower electrical power consumption. These benefits are attractive in portable handheld devices, such as bio-hazard sensors or glucose monitors.

DETAILED DESCRIPTION

Figure 1:
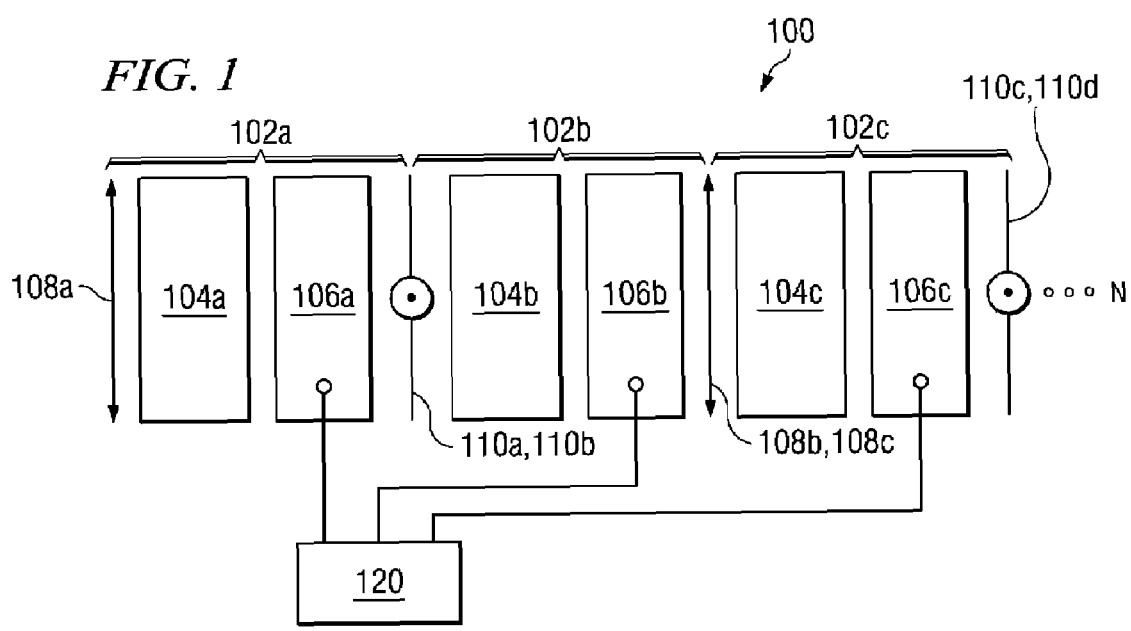
FIG. 1 is a general block diagram illustrating a presently disclosed digitally tuned filter embodiment.

FIG. 1 is a general block diagram 100 illustrating a digitally-switchable liquid crystal (LC) cell 106 as a quasi-neutral polarization switch for accessing pre-defined sets of spectral profiles from a retarder stack 104. Similar to a Lyot filter, each block 102 represents an independent filter stage. Several stages 102a, 102b, 102c of this digitally tuned filter 100 are illustrated, with each stage having a polarizer 108, a retarder stack filter 104, a LC polarization switch 106, and another polarizer 110. Neighboring filter stages 102a, 102b, 102c may share polarizers 108, 110. For example, polarizer 110a, 110b is a part of stages 102a, 102b, while polarizer 108b, 108c is a part of stages 102b, 102c. The polarizers 108, 110 may have alternate orientations from each other. If the polarization orientations alternate, then each stage 102 will have crossed polarizers 108, 110.

The optical elements 104, 106, 108, 110 may be coupled with a water-clear transparent index-matched adhesive. The task of generating a high-quality bandpass profile in this embodiment is mostly confined to a single element: the retarder stack 104 within each stage 102. Localizing the critical filtering function to each stage 102 improves manufacturability, minimizes or eliminates calibration, and reduces cost. Although only three filtering stages 102 are illustrated, there may be an arbitrary number (N) of filter stages 102.

Figure 2:
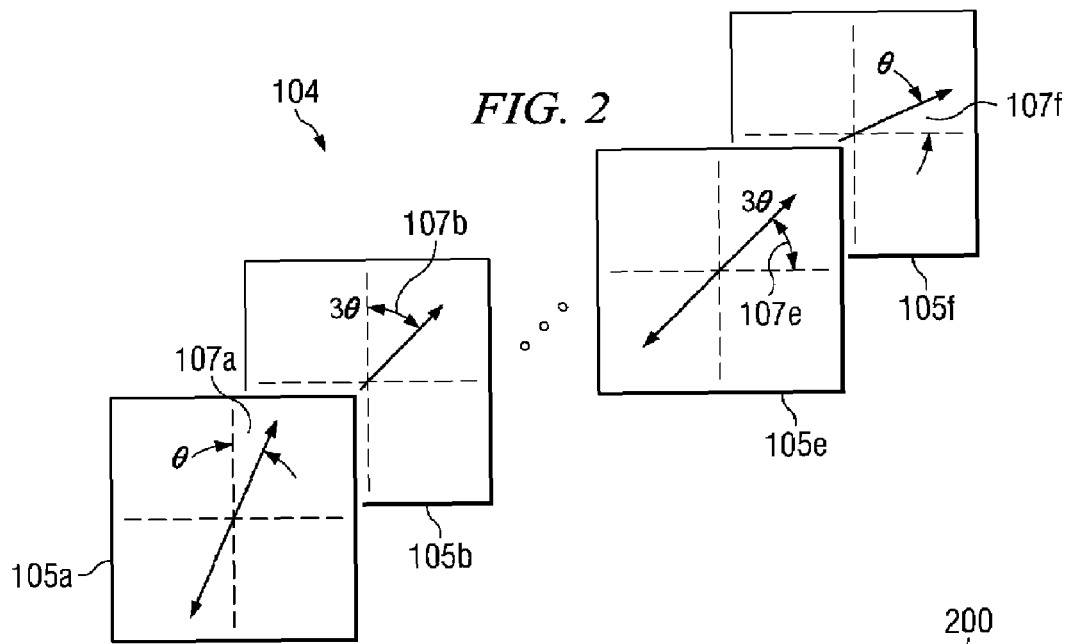
FIG. 2 is an example of a retarder stack.
Figure 3:
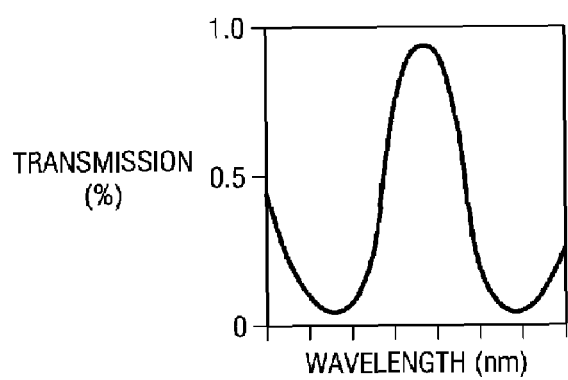
FIG. 3 illustrates a spectral profile that may be encoded by retarder stack films.

FIG. 2 illustrates a retarder stack 104, which is a multi-layer laminate of bulk transparent-stretched polymer retarder films 105. These films are ideally laminated using a solvent bonding process. Through a suitable selection of films' 105 in-plane angles (or optic axis orientations) "θs" 107, arbitrary spectral profiles 200 can be encoded as polarization information, such as illustrated in FIG. 3. The illustrated angles of θ and 3θ and their relationship to respective axes of the retarder stack layers, as well as the resulting profile of FIG. 3 are all solely for purposes of illustration and shall not be viewed as limiting in any way.

When a retarder stack 104 is positioned between neutral polarizers 108, 110 as previously described, moderate finesse bandpass profiles 200 with OD3 dynamic ranges may be produced. "OD3" is defined as "Optical Density 3," where optical density is expressed by $\log 10(1/T)$, where T is transmittance, and where $\log 10(1/T) = -30$ dB at the OD3 "filtered" level; in other words, the OD3 level of optical filtering is an optical filtering with three orders of magnitude between the unfiltered and filtered levels. This dynamic range allows a high degree of filter functionality in a single low-cost component (the retarder stack 104) that will, in principle, have lower signal loss. Presently, retarder stacks 104 with 12 to 18 layers may be mass-produced for the optical projection industry at a mean price of only a few dollars per square inch. The features and functions of retarder stacks 104 are further described in a commonly assigned U.S. Pat. No. 6,452,646 entitled "Optical retarder stack formed of multiple retarder sheets," which is incorporated herein by reference in its entirety for all purposes.

Figure 4A:
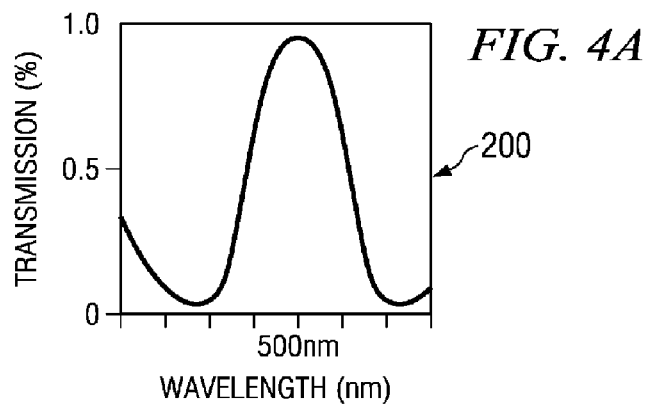
FIGS. 4A-4B illustrate a bandpass spectrum and the complementary notch spectrum for an exemplary filter according to the present disclosure.
Figure 4B:
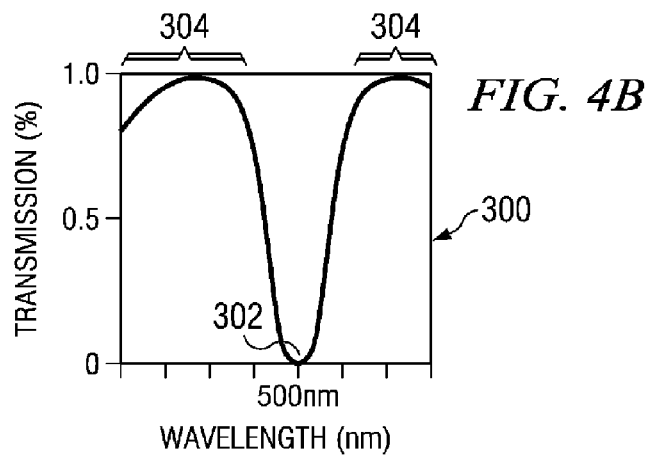

When a neutral LC polarization switch 106 is adjacent to a retarder stack 104 and between polarizing films 108, 110 (see FIG. 1), the outputted spectral profile can be electronically switched between a bandpass spectrum 200 and the complementary notch spectrum 300, as illustrated in FIGS. 4A-4B, respectively. An exemplary digitally tuned filter 100 with N-stages according to the presently disclosed embodiment can generate each bandpass profile 200 as the product of a single bandpass function with (N−1) notch spectra 300. The notch spectra 300 can serve to incrementally improve resolution and dynamic range, but has relatively little impact on the bandpass profile 200. As such, there is little coupling between stages 102, which again improves manufacturability.

In principle, any polarization interference filter containing N digitally-switchable LC cells 106 is capable of providing $2^N$ distinct spectral outputs 200. This scaling is attractive from the standpoint of minimizing the number of LC cells 106 and filter stages 102, but generally involves a high degree of spectral coupling between stages 102, which hampers performance robustness and detracts from manufacturability. One aspect of the present disclosure is to use a scheme in which the number of output bands 200 scales linearly with the number of LC cells 106. Potential benefits include creating the desired independence between stages 102, and using the isotropic state of the LC cell 106 for generating the critical bandpass profile 200.

It is generally the case that nematic LC cells 106 operating as digitally-switchable elements have one voltage state that is substantially more or less chromatic than the alternate state. For instance, a 90° twisted-nematic LC cell 106 has a self-compensation feature, such that the driven state is very nearly isotropic. It is not unusual for a driven twisted-nematic LC cell 106 between crossed polarizers 108, 110 to have a light leakage below 0.1% at normal incidence. Conversely, it requires substantial effort to design a twisted-nematic LC cell 106 that provides a wavelength independent conversion of input linearly polarized light to the orthogonal polarization. In practice, twisted-nematic LC cells 106 with reasonable switching speeds have relatively high degrees of chromaticity to their polarization conversion spectrum. This has the effect of compromising the performance of the retarder stack 104, most notably by reducing the dynamic range. In a preferred embodiment, the driven state is preferably used to generate the bandpass profile 200 to minimize compromising the spectrum.

In one design, and in a particular example a twisted nematic design, the retarder stack 104 is designed and positioned such that each layer of the retarder stack has a retarder angle that is acute (less than 45 degrees) relative to the rub direction of an alignment layer of one of the transparent electrodes of the LC cell 106. In this design, the light is introduced with a state-of-polarization that is parallel to the rubbing direction of that transparent electrode.

In practice, a twisted-nematic LC cell 106 can be designed to be more achromatic in the converting state than other devices (e.g. a π-cell). This translates into reduced sensitivity to cell gap non-uniformity, which translates into spatial non-uniformity of the transmission state. As cells are not completely uniform most of the time, this is another reason for assigning the zero-conversion state of the bandpass output. In a first-minimum twisted-nematic LC cell 106, one fringe does not represent significant transmission non-uniformity.

Given the above, the low voltage state of the twisted-nematic LC cell 106 can generate a notch filter spectrum 300 with minimally compromised performance. The degree of degradation increases with the spectral coverage of the filter (e.g. 420-680 nm for visible switching). This typically manifests itself as leakage at the notch center wavelength 302 or as throughput loss outside of the notch 304. In another embodiment, the low-voltage state of the twisted-nematic LC cell 106 can be tuned in order to position the wavelength of ideal polarization conversion to correspond to the center wavelength of the selected bandpass. This first-order analog correction to the low voltage state is relatively tolerant, such that 3 bits of voltage level is generally adequate to insure high throughput of the bandpass.

Referring again to FIG. 1, the application of voltages to the LC cells 106 of the several filter stages 102 is shown. Multiple sets of input voltages can be applied to the voltage inputs of the LC cells 106 in order to achieve desired filter characteristics. The voltages may be analog voltages generated by conversion of digital signals from a microcontroller 120 applied to digital-to-analog conversion circuitry (not shown) or the voltages may be otherwise generated to be applied to the voltage inputs. By this configuration, the optical filter characteristics can be flexibly tuned under digital control according to system design needs and flexibly adjusted according to changing performance needs.

Figure 5:
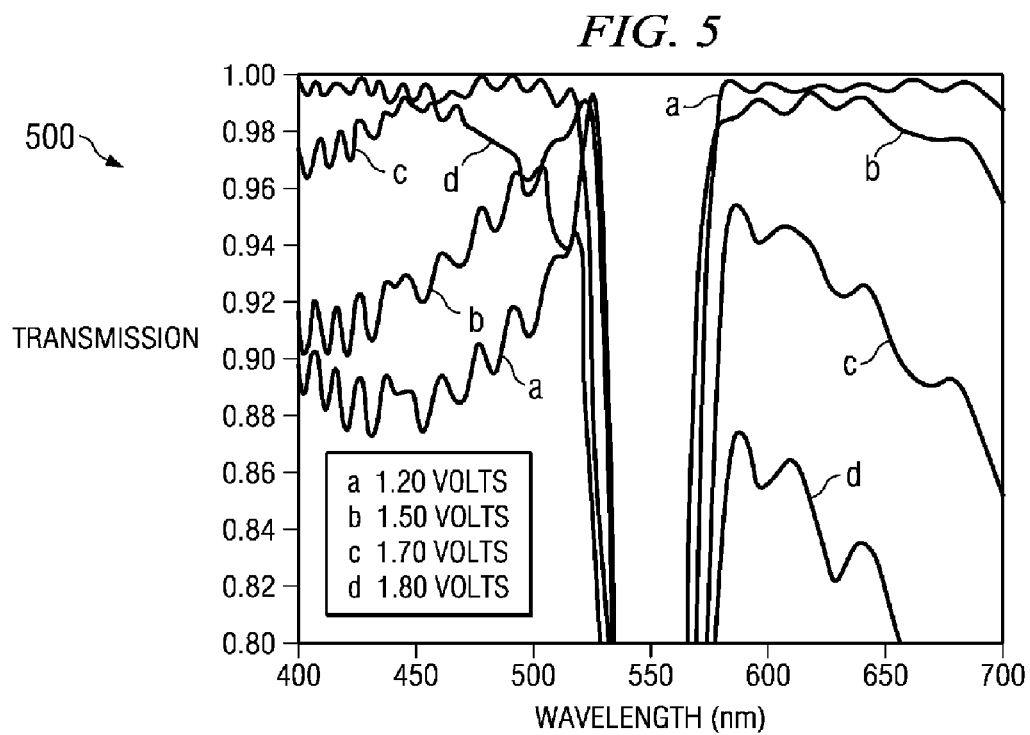
FIG. 5 illustrates four transmission tuning spectra of a single stage filter incorporating a twisted-nematic liquid crystal cell.

FIG. 5 shows peak transmission tuning spectra 500 of a single stage (12-layer bandpass stack with OD3 blocking) first-minimum twisted-nematic LC cell 106 between crossed polarizers 108, 110. Four spectra are illustrated corresponding to different voltage levels 500a, 500b, 500c, 500d. This spectra sampling sufficiently limits the loss in the 400 to 700 nm band to below 1%. Additional levels may be required to, for instance, reduce losses further, or to compensate for temperature effects.

In addition to twisted-nematic LC cells 106, the general principle may apply to other LC modes. A parallel-aligned nematic (electrically controlled birefringence, or ECB) LC cell 106 and π-cell 106 do not provide self-compensation, which can give residual retardation at any high-voltage level. A film compensator may be used to produce the preferred isotropic state for generating the bandpass spectrum. For a vertically-aligned nematic LC cell 106 with reversible voltage states, a potential benefit is that the cell may have low in-plane retardation at zero volts and low pretilt, and may avoid compensation. If not, however, a film compensator can also be used to eliminate any residual retardation. Other LC cells, such as ferroelectric LC cells 106 may also be achromatized with film compensators. In-plane LC switches, such as ferroelectric LC cells 106, offer the unique feature that both the zero-conversion and 90° conversion states can be quasi-achromatic. Furthermore, ferroelectric LC cells 106 are bistable and therefore may not require analog tuning of the converting states for maximum throughput. However, ferroelectric LC cells 106 are relatively uncommon and expensive, and are not as mechanically or thermally stable as nematic LC cells 106.

According to the presently disclosed embodiments, the selection of a center wavelength for each bandpass spectra of a composite filter is arbitrary until the profiles begin to overlap. There are benefits to the dynamic range by close packing of bandpass spectra. However, there exists maximum bandpass packing, which depends upon the width and shape of the bandpass profile. In general, polarization interference filter bandpass spectra are the result of a compromise between the number of films and finesse (ratio of separation between the periodic spectra to the full width of the profile). The result is that the normal incidence bandpass is relatively smooth, unlike the steep edge-functions characteristic of dichroic or holographic filters. Consequently, there is often a spectral tail associated with a notch profile, which if positioned too close to an adjacent bandpass, can produce a significant throughput loss. The characteristics of the tail depend on the degree of apodization. As such, there is a limitation to the spectral sampling interval imposed by the retarder stack filter profile. The described effects will be better illustrated in subsequent figures and discussion.

Figure 6:
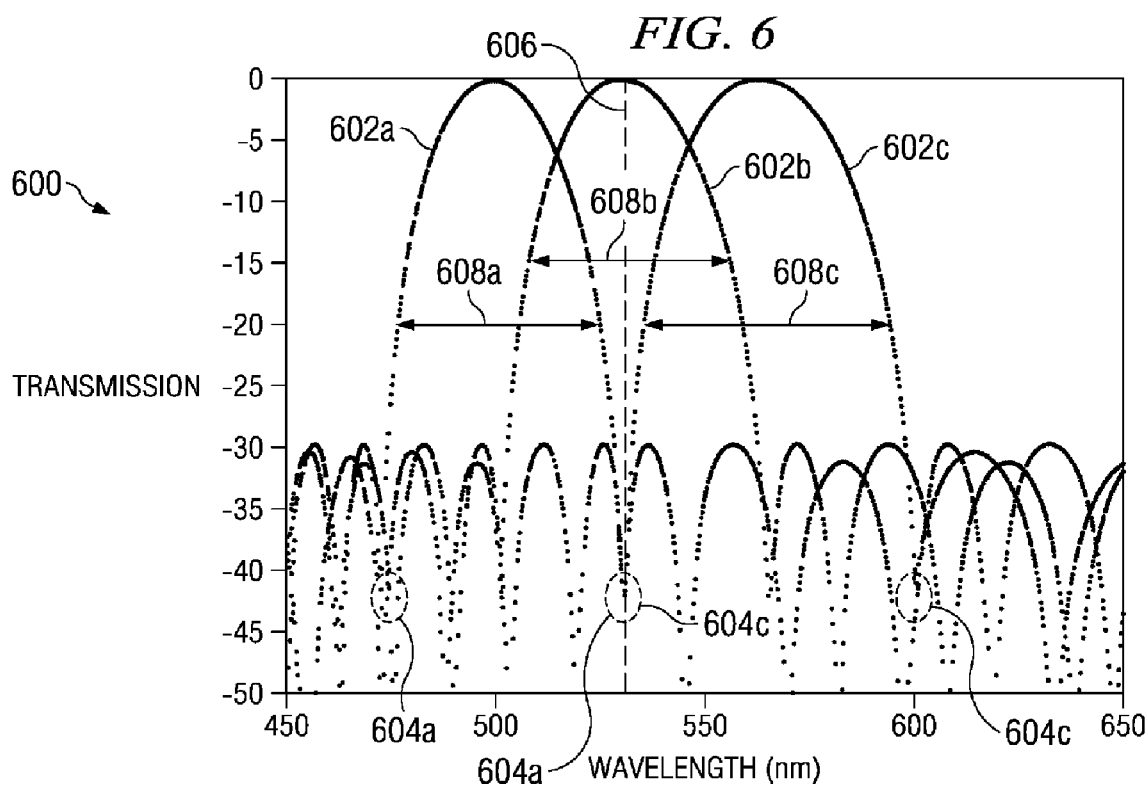
FIG. 6 is a graph illustrating the minimum spectra separation criteria.
Figure 7:
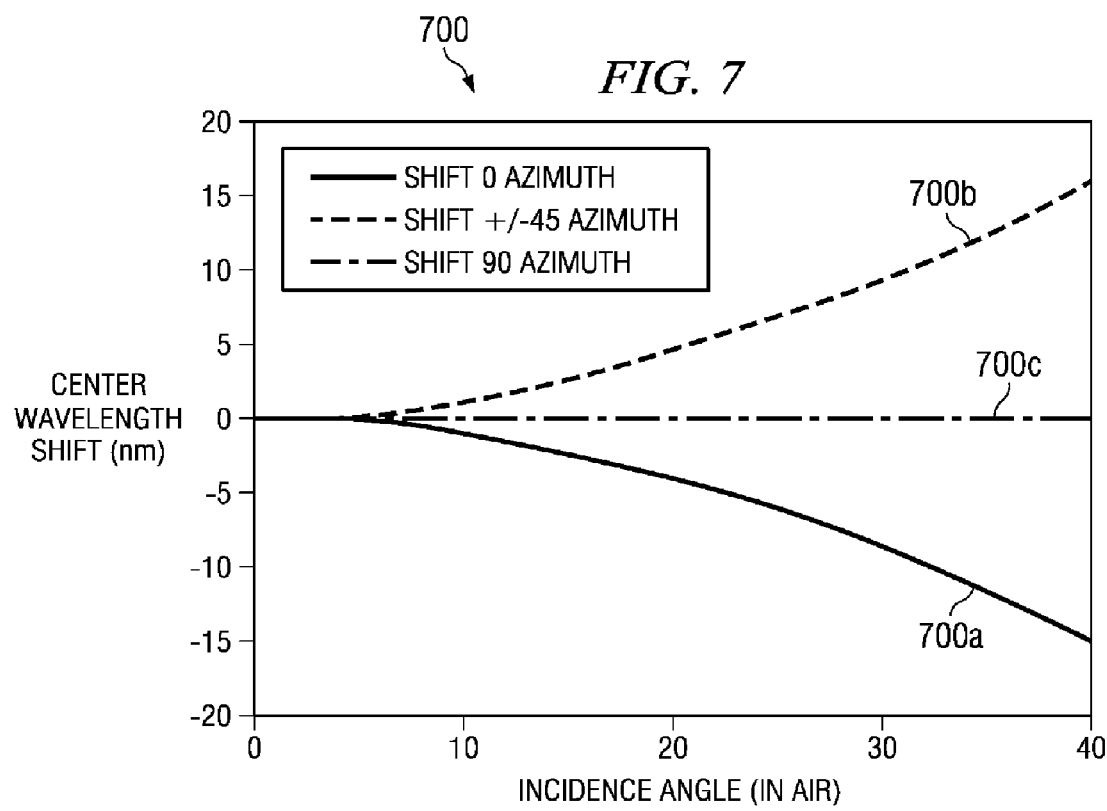
FIG. 7 is a graph illustrating the spectral shift of a uniaxial bandpass filter.

FIG. 6 is a graph illustrating the minimum spectra separation criteria 600 using a 12-layer design, where an OD3 maximum side-lobe level design is used (−30 dB). The maximum spectral sampling is a function of resolution, subject to the requirement that throughput is not too much affected by adjacent notches. The criterion used is that the first minima 604a, 604c of adjacent bandpass stages 602a, 602c correspond to the center wavelength 606 of the central band 602b. This is equivalent to requiring zero loss of the notch spectra at the bandpass center wavelength 606. The figure shows that the central bandpass spectrum 602b and the first null 604a, 604c of adjacent bandpass spectra 602a, 602c occur at around 531 nm. Mathematically, an estimate of the separation for this case is given by: $\Delta\lambda = (4/3)$ (FWHM), where $\Delta\lambda$ is the separation or free spectral range, and where FWHM is the full width at half maximum 608 of a transmission peak 602.

the spectral performance of a manufactured stack may be more consistent with theoretical prediction, subject to the real-world issues of retardation statistics, optic axis statistics, and the influence of the lamination process. In addition, by using small-angle designs, the center wavelength spectral shift of a uniaxial bandpass filter versus incidence angle (in air) will be quite similar to that of a single multi-order retarder oriented along zero as illustrated in FIG. 7. Like a positive uniaxial retarder, there is a negative shift in the plane of the optic axis 700a, a positive shift in the orthogonal plane of similar magnitude 700b, and almost no shift in the ±45° azimuth 700c. For square parts, the latter should correspond to the corners of the part, where the angle of incidence is the largest.

Bandpass designs are preferably apodized, such that peak side-lobe levels remain below 0.1% (OD3). In order to converge to this level of performance in manufacturing, spatial statistics of the retarder film 105 must be maintained to a very tight level. Ideally, the standard deviation for a cross-web measurement is approximately ±1-2 nm (spectral shift) and ±0.2°, and is fairly smooth. In a well-controlled stretching process, down-web statistics are relatively slow-varying so the statistics are relatively stable over the span corresponding to the layout of a single mother sheet of retarder-stack material.

With these constraints, there is generally a small-angle retarder stack design 104, such that the optic axis angles 107 are clustered about an input polarization direction. In the following exemplary stack design 104, the angles 107 do not deviate by more than ±7° and the side-lobe levels in the stop band do not exceed 0.1% between crossed polarizers 108, 110.

| | Design | | | | | | | | | | | | |
|---|---|---|---|---|---|---|---|---|---|---|---|---|---|
| | $\alpha_1$ | $\alpha_2$ | $\alpha_3$ | $\alpha_4$ | $\alpha_5$ | $\alpha_6$ | $\alpha_7$ | $\alpha_8$ | $\alpha_9$ | $\alpha_{10}$ | $\alpha_{11}$ | $\alpha_{12}$ | $\alpha_{13}$ |
| BP12 | −1.7 | 1.5 | −3.3 | 4.1 | −5.2 | 6.1 | −5.8 | 5.8 | −4.0 | 3.8 | −1.5 | 1.9 | N/A |
| BP13 | 1.8 | −0.9 | 3.4 | −2.8 | 5.4 | −4.5 | 6.4 | −4.6 | 5.6 | −3.0 | 3.6 | −1.1 | 1.9 |

Based on the formula, the overlap point occurs at roughly 25-30% at this side-lobe level. There are resolution benefits to densely packing the spectra. The adjacent spectra 602a, 602c will tend to narrow the base of the bandpass. With a 12-layer bandpass design centered at 535 nm, the 1% width of the profile is 53 nm. When notch filters of the same design are densely packed on either side of this profile, the 1% base width becomes 47 nm. Moreover, the notch provides enhancement of the dynamic range over a small range of wavelengths.

In another embodiment, preferred retarder stacks 104 may be designed based on small angle solutions. These designs are based on films 105 with multi-order half-wave retardation at the center wavelength of the bandpass profile. Using this mode, a relatively small portion of the spectrum is converted to the orthogonal state, giving a bandpass between crossed polarizers 108, 110. A preferred embodiment is to use an optimized bandpass design with a particular number of retarder films 105, which can achieve the selected dynamic ranges (or stop-band ripple) with minimum bandpass width.

There are several benefits to the small-angle retarder stack design. First, the geometrical yield of the film cut from the roll stock is maximized. Second, and perhaps more importantly, Preferred stack designs convert the narrowest possible bandwidth to the orthogonal polarization (per number of films) with prescribed dynamic range (e.g. OD3). This is a relative of the Solc filter, though preferably with improved apodization. Using a stack 104 composed of films 105 with identical retardation (giving a real impulse response with N+1 terms), the bandpass has symmetric behavior in the frequency domain with respect to the half-wave wavelength. A stack 104 consisting of an odd number of films 105 (BP13) is known to behave as a compound half-wave retarder at the half-wave wavelength, while a stack 104 consisting of an even number of films 105 (BP12) behaves as a pure rotator at this wavelength. Because the transmission band is quite narrow, the behavior of the stack 104 over the spectral range can be fairly uniform.

Such is not the case on the unconverted band, where small-angle designs generate significant compound retardation along the input polarization. The compound retardation is frequently a significant fraction of the total retardation in the stack 104. Therefore, there is a critical orientation alignment of the retarder stack 104 with respect to the polarizers 108, 110 in order to insure that the dynamic range is not degraded.

An orientation error can significantly raise side-lobe levels, as this gives a projection of the electric field along both axes of the compound retarder.

A preferred set of solutions has retarder angles 107 that are symmetric with respect to a midpoint. When the number of retarders 105 is odd (BP13), the preferred stack design conforms to the angle sequence $(\alpha_1, \alpha_2, \alpha_3, \ldots \alpha_N, \alpha_0, \alpha_N, \ldots \alpha_3, \alpha_2, \alpha_1)$. When the number of retarders 105 is even (BP12), the preferred stack design conforms to the angle sequence $(\alpha_1, \alpha_2, \alpha_3, \ldots \alpha_N, -\alpha_N, \ldots -\alpha_3, -\alpha_2, -\alpha_1)$. As previously discussed, these angles 107 are preferably smaller than $\pm 7°$. When a bandpass design uses an odd number of films 105 (BP13), the preferred set of solutions has pure half-wave retardation in the converted band. When a bandpass design uses an even number of films 105 (BP12), the preferred set of solutions has pure rotation in the converted band.

Figure 8:
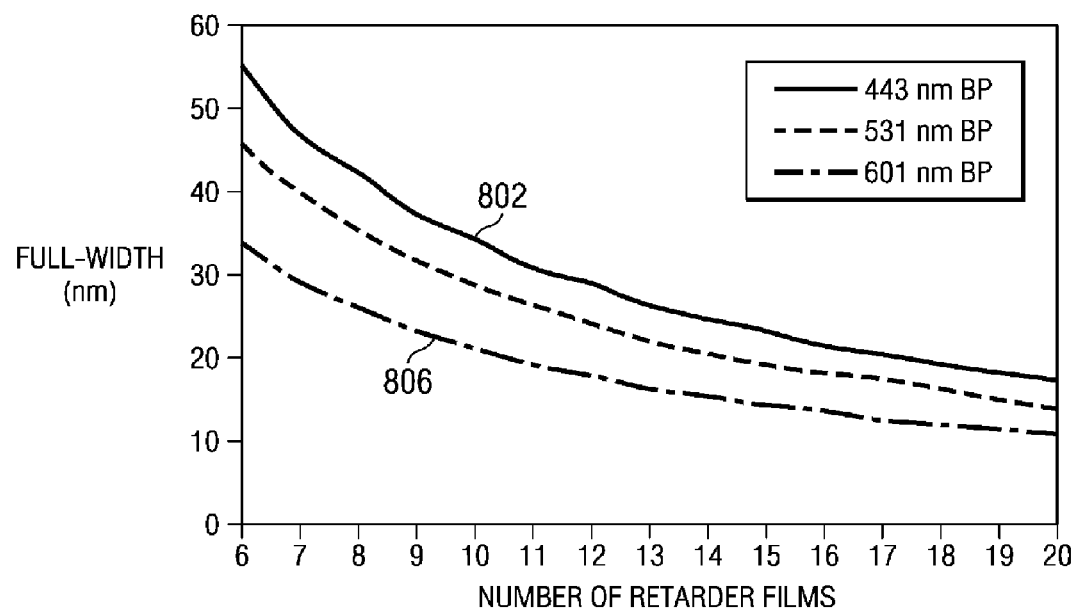
FIG. 8 is a graph illustrating resolution versus number of retarder films at different bandpass wavelengths.

Apart from the relationship between throughput and spectral overlap, the digitally tuned filter 100 can permit independent selection of spectral profiles from retarder stacks 104. An example of this is managing the wavelength dependent resolution of polarization interference filters based on retardation dispersion. For instance, a conventional tunable polarization interference filter using polycarbonate dispersion with 18 nm FWHM resolution at 440 nm has a resolution of 33 nm at 655 nm. Using a digitally tuned filter 100 of the presently disclosed embodiment, the number of retarder films 105 can be selected in order to provide constant resolution throughout the operating band. At a fixed resolution (FWHM), the number of retarder films 105 needed in a 443 nm bandpass 802 is fewer than the number of retarder films 105 in a 601 nm bandpass 806 as illustrated in FIG. 8.

Additionally, film-based digitally tuned filters 100 allow a significant range in resolution while maintaining an acceptable number of layers. If the range of free spectral range is large, then 1.5-wave retarder films 105 can be used. If the free spectral range is small, but requires greater resolution, then films 105 with 2.5-waves of retardation can be used. Additional waves of retardation may also increase resolution.

Digitally tuned filters 100 of the presently disclosed embodiment may be used in a number of applications. In applications involving electronic sensors, such as silicon detectors of CMOS/CCD detector array, the filters 100 can be used to control the spectrum of light illuminating a scene. Alternatively, the scene can be illuminated with natural light and the filters 100 can be placed directly adjacent to the sensor. Filters 100 can be placed before the imaging optics, frequently relaxing the field-of-view and cosmetic requirements, but increasing the aperture size. Filters 100 placed between the imaging optics generally are smaller, but the optical quality and stability of the transmission spectrum with incidence angle is more critical.

Exemplary applications of the systems above include an image projection system in which the optical components are used with the digital filter in order to scan through wavelength spectra to be projected on an image plane. In another possible application, the digital filter is to scan through light focused by the optical components onto a CMOS or CCD detector array.

Figure 9:
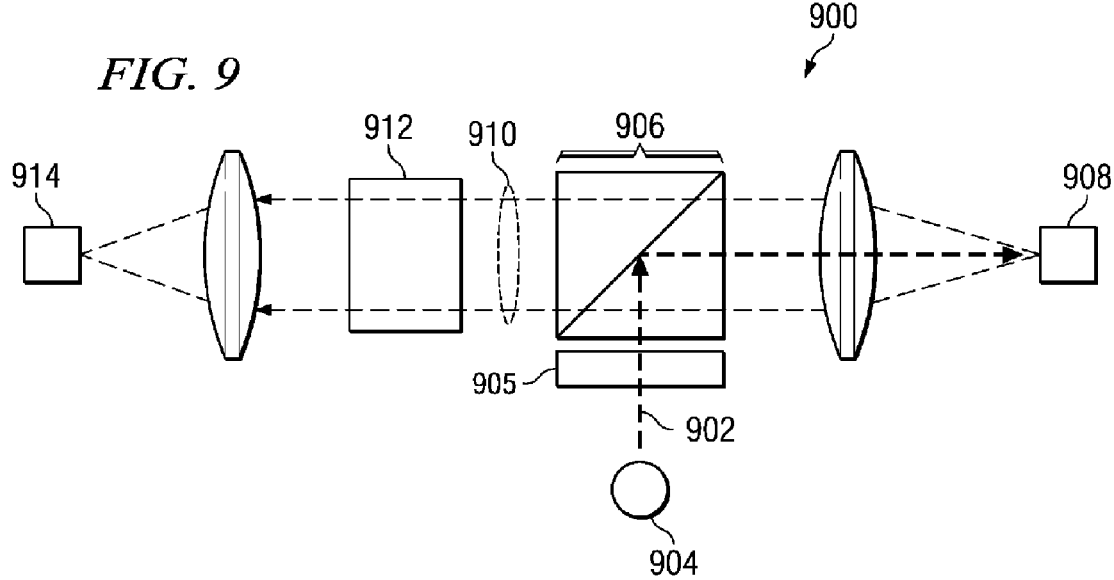
FIG. 9 is a block diagram of a digitally tuned filter embodiment in a portable handheld device application.

FIG. 9 illustrates a digitally tuned filter 912 in a fluorescence or other spectrometry system 900. Light 902 from a lamp 904 in connection with a bandpass excitation filter 905 or light from a laser is filtered and reflected from a beam splitter 906, and focused onto a sample 908. The beam splitter 906 may also comprise a narrow-band reflecting coating at its reflecting surface. The sample 908 emits a fluorescence signature 910, which passes through the beam splitter 906. This signature light 910 is filtered by the digitally tuned filter 912, which cycles through a sequence of bandpass spectra, and is focused/imaged onto a sensor 914. Through this wavelength scanning, which also might be performed in the optical path before impinging upon the sample 908, the spectral profile of the signature light 910 can be measured. Control and sensing may be achieved by a digital controller 120 positioned to provide voltage control signals to the LC cells 106 as illustrated in FIG. 1.

It will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes that come within the meaning and ranges of equivalents thereof are intended to be embraced therein.

Additionally, the section headings herein are provided for consistency with the suggestions under 37 C.F.R. §1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called technical field. Further, a description of a technology in the "Background" is not to be construed as an admission that technology is prior art to any invention(s) in this disclosure. Neither is the "Summary" to be considered as a characterization of the invention(s) set forth in the claims found herein. Furthermore, any reference in this disclosure to "invention" in the singular should not be used to argue that there is only a single point of novelty claimed in this disclosure. Multiple inventions may be set forth according to the limitations of the multiple claims associated with this disclosure, and the claims accordingly define the invention(s), and their equivalents, that are protected thereby. In all instances, the scope of the claims shall be considered on their own merits in light of the specification, but should not be constrained by the headings set forth herein.

What is claimed is:

1. An optical filter for filtering a beam of light passing through it, the optical filter comprising:
    a retarder stack, the retarder stack comprising at least three retarder layers wherein the retarder layers have substantially the same retardance values, and the retarder angles of the retarder layers are substantially symmetric relative to the middle of the retarder stack;
    a liquid crystal cell adjacent to the retarder stack, the liquid crystal having a voltage input and operable at least at a certain input voltage signal at its voltage input to impart no change of the state of polarization of the light beam passing through the optical filter; and
    first and second polarizers on opposite sides of the adjacent retarder stack and liquid crystal cell such that polarization of the beam of light remains substantially unchanged between the liquid crystal cell and the one of the first and second polarizers that is adjacent to the liquid crystal cell.

2. The optical filter of claim 1 wherein retarder stack has an even number (1 to M) of retarder layers and wherein the middle of the stack is between the M/2 layer and the M/2+1 layer.

3. The optical filter of claim 1 wherein retarder stack has an odd number (1 to M) of retarder layers and wherein the middle of the stack is the middle of the M/2 layer.

4. The optical filter of claim 1, wherein the first and second polarizers are oriented orthogonally to each other.

5. The optical filter of claim 1 wherein a certain wavelength band of the light beam is polarization converted.

6. The optical filter of claim 5 wherein the retarder stack has an odd number of films and wherein the light beam has a polarization that is retarded by half of the wavelength in the certain wavelength band.

7. The optical filter of claim 5 wherein the retarder stack has an even number of films and wherein the light beam has a polarization that is substantially purely rotated in the certain wavelength band.

8. The optical filter of claim 1, wherein the retarder angle of each of the retarder layers is less than approximately ±7° with respect to the input polarization.

9. The optical filter of claim 1, wherein the optical filter is a bandpass filter when the liquid crystal cell receives the certain input voltage signal and wherein the optical filter comprises a "notch" filter when the liquid crystal cell is driven with another input voltage.

10. The optical filter of claim 1, and further comprising:
another retarder stack;
another liquid crystal cell, the another liquid crystal having a voltage input and operable at least at a certain input voltage signal at its voltage input to impart no change of the state of polarization of the light beam passing through the optical filter,
the another retarder stack and another liquid cell positioned adjacent to each other and collectively adjacent to one of the first and second polarizers; and
a third polarizer positioned such that the collectively adjacent another retarder stack and another liquid crystal cell are interposed between the third polarizer and the one of the first and second polarizers.

11. The optical filter of claim 10, wherein the retarder stack, the liquid crystal cell, and the first and second polarizers comprise a first filter stage and wherein the another retarder stack, the another liquid crystal cell, the one of the first and second polarizers, and the third polarizer comprise a second filter stage.

12. The optical filter of claim 11, wherein the filter is operable to receive a first set of input voltage signals at the voltage inputs of the liquid crystal cell and the another liquid crystal cell, and wherein one of the first and second filter stages is a bandpass filter when its respective liquid crystal cell receives one of the first set of input voltage signals and wherein the other filter stage comprises a "notch" filter when its respective liquid crystal cell is driven with another input voltage signal.

13. The optical filter of claim 12, wherein the filter is further operable to receive a second set of input voltage signals at the voltage inputs whereby the other of the first and second filter stages is a bandpass filter and the one of the first and second filter stages comprises a "notch" filter.

14. The optical filter of claim 13, wherein the respective notches of the first and second filters are substantially non-overlapping.

15. The optical filter of claim 1, wherein the liquid crystal cell is of a construction selected from the group consisting of twisted nematic, electrically controlled birefringence, pi-cell, ferroelectric, and vertically aligned nematic.

16. The optical filter of claim 1, wherein the liquid crystal cell is a twisted nematic cell comprised of two transparent electrodes and a liquid crystal material interposed between the two electrodes, the two transparent electrodes each having an alignment layer with a rub direction, wherein the retarder angle of each of the retarder layers is less than approximately ±45° with respect to the rubbing direction of one of the alignment layers.

17. A filter according to claim 1, wherein the retarder angles of each of the retarder layers is clustered about an input polarization direction of the incoming beam of light.

18. An optical filter for filtering a beam of light passing through it, the optical filter comprising:
a first retarder stack, the first retarder stack comprising at least three retarder layers wherein the retarder layers have substantially the same retardance values, and the retarder angles of the retarder layers are substantially symmetric relative to the middle of the retarder stack;
a first liquid crystal cell adjacent to the first retarder stack, the first liquid crystal having a voltage input and operable at least at a certain input voltage signal at its voltage input to impart no change of the state of polarization of the beam of light passing through the optical filter;
first and second polarizers on opposite sides of the adjacent first retarder stack and first liquid crystal cell;
a second retarder stack;
a second liquid crystal cell, the second liquid crystal having a voltage input and operable at least at a certain input voltage signal at its voltage input to impart no change of the state of polarization of the beam of light passing through the optical filter,
the second retarder stack and second liquid cell positioned adjacent to each other and collectively adjacent to one of the first and second polarizers; and
a third polarizer positioned such that the collectively adjacent second retarder stack and second liquid crystal cell are interposed between the third polarizer and the one of the first and second polarizers, and such that polarization of the beam of light remains substantially unchanged between the second liquid crystal cell and the third polarizer.

19. The optical filter of claim 18, wherein the filter is operable to receive a first set of input voltage signals at the voltage inputs of the first and second liquid crystal cells, and wherein one of the first and second filter stages is substantially achromatic when its respective liquid crystal cell receives one of the first set of input voltage signals and wherein the other filter stage comprises a "notch" filter when its respective liquid crystal cell is driven with another of the set of input voltage signals.

20. The optical filter of claim 19, wherein the filter is further operable to receive a second set of input voltage signals at the voltage inputs whereby the other of the first and second filter stages is substantially achromatic and the one of the first and second filter stages comprises a "notch" filter.

21. A digitally tuned optical filter having digitally tuned optical filtering characteristics, the digitally tuned optical filter comprising:
a first retarder stack, the first retarder stack comprising at least three retarder layers wherein the retarder layers have substantially the same retardance values, and the retarder angles of the retarder layers are substantially symmetric relative to the middle of the retarder stack;
a first liquid crystal cell adjacent to the first retarder stack, the first liquid crystal having a voltage input and operable at least at a certain input voltage signal at its voltage input to impart no change of the state of polarization of a beam of light passing through the optical filter;
first and second polarizers on opposite sides of the adjacent first retarder stack and first liquid crystal cell;
a second retarder stack;
a second liquid crystal cell, the second liquid crystal having a voltage input and operable at least at a certain input voltage signal at its voltage input to impart no change of the state of polarization of the beam of light passing through the optical filter, the second retarder stack and second liquid cell positioned adjacent to each other and collectively adjacent to one of the first and second polarizers;

a third polarizer positioned such that the collectively adjacent second retarder stack and second liquid crystal cell are interposed between the third polarizer and the one of the first and second polarizers, and such that polarization of the beam of light remains substantially unchanged between the second liquid crystal cell and the third polarizer; and a controller in electrical communication with the first and second liquid crystal cells, the controller operable to apply at least first and second sets of input voltage signals to the first and second liquid crystal cells to thereby tune the filtering characteristics of the optical filter.

22. A spectrometry system for measuring a signature light from a sample to be measured, the spectrometry system comprising:

a light source;

optical components operable to focus light from the light source onto the sample to be measured;

a digitally tuned optical filter having digitally tuned optical filtering characteristics, comprising:

a first retarder stack, the first retarder stack comprising at least three retarder layers wherein the retarder layers have substantially the same retardance values, and the retarder angles of the retarder layers are substantially symmetric relative to the middle of the retarder stack;

a first liquid crystal cell adjacent to the first retarder stack, the first liquid crystal having a voltage input and operable at least at a certain input voltage signal at its voltage input to impart no change of the state of polarization of the beam of light passing through the optical filter;

first and second polarizers on opposite sides of the adjacent first retarder stack and first liquid crystal cell;

a second retarder stack;

a second liquid crystal cell, the second liquid crystal having a voltage input and operable at least at a certain input voltage signal at its voltage input to impart no change of the state of polarization of the beam of light passing through the optical filter, the second retarder stack and second liquid cell positioned adjacent to each other and collectively adjacent to one of the first and second polarizers;

a third polarizer positioned such that the collectively adjacent second retarder stack and second liquid crystal cell are interposed between the third polarizer and the one of the first and second polarizers, and such that polarization of the beam of light remains substantially unchanged between the second liquid crystal cell and the third polarizer; and a controller in electrical communication with the first and second liquid crystal cells, the controller operable to apply at least first and second sets of input voltage signals to the first and second liquid crystal cells to thereby tune the filtering characteristics of the optical filter; and an optical sensor positioned to receive light from the sample.

23. The spectrometry system of claim 22 where the light received from the sample is fluoresced by the sample.

24. The spectrometry system of claim 22 where digital filter is positioned optically after the sample.

25. The spectrometry system of claim 22 where the digital filter is positioned optically before the sample.

26. The spectrometry system of claim 22 where the digital filter scans through optical wavelength spectra.

27. An optical imaging system using a digitally tuned filter comprising:

optical components operable to focus light from a light source; and a digitally tuned optical filter having digitally tuned optical filtering characteristics, comprising:

a first retarder stack, the first retarder stack comprising at least three retarder layers wherein the retarder layers have substantially the same retardance values, and the retarder angles of the retarder layers are substantially symmetric relative to the middle of the retarder stack;

a first liquid crystal cell adjacent to the first retarder stack, the first liquid crystal having a voltage input and operable at least at a certain input voltage signal at its voltage input to impart no change of the state of polarization of the beam of light passing through the optical filter;

first and second polarizers on opposite sides of the adjacent first retarder stack and first liquid crystal cell;

a second retarder stack;

a second liquid crystal cell, the second liquid crystal having a voltage input and operable at least at a certain input voltage signal at its voltage input to impart no change of the state of polarization of the beam of light passing through the optical filter, the second retarder stack and second liquid cell positioned adjacent to each other and collectively adjacent to one of the first and second polarizers;

a third polarizer positioned such that the collectively adjacent second retarder stack and second liquid crystal cell are interposed between the third polarizer and the one of the first and second polarizers, and such that polarization of the beam of light remains substantially unchanged between the second liquid crystal cell and the third polarizer; and a controller in electrical communication with the first and second liquid crystal cells, the controller operable to apply at least first and second sets of input voltage signals to the first and second liquid crystal cells to thereby tune the filtering characteristics of the optical filter.

28. The optical imaging system of claim 27 and further comprising an optical sensor upon which the optical components are operable to focus the light from the light source.

29. The optical imaging system of claim 27 and further comprising an image plane upon which the optical components are operable to focus the light from the light source.

30. The optical imagining system of claim 27 and further comprising the light source.

31. The optical imaging system of claim 27 wherein the digital filter is operable under control of the controller to scan through optical wavelength spectra.

32. The optical imaging system of claim 31 wherein the digital filter is positioned after the optical components to scan through the optical wavelength spectra of the received light.

33. The optical imaging system of claim 31 wherein the digital filter is positioned before the optical components to scan through the optical wavelength spectra of the light from the light source.

34. The optical imaging system of claim 31 wherein the optical imaging system is a CMOS or CCD detector array.

35. The optical imaging system of claim 31 wherein the optical imaging system is an image projection system.

* * * * *